GEORGE COPELAND.
Improvement in Machines for Washing Grain.

No. 126,523.  Patented May 7, 1872.

Inventor.
George Copeland

Witnesses.

UNITED STATES PATENT OFFICE.

GEORGE COPELAND, OF DENVER, COLORADO TERRITORY.

IMPROVEMENT IN MACHINES FOR WASHING GRAIN.

Specification forming part of Letters Patent No. 126,523, dated May 7, 1872.

*To all whom it may concern:*

Be it known that I, GEORGE COPELAND, of Denver, in the county of Arapahoe, Territory of Colorado, have invented a new and Improved Machine for Washing Grain; and I do hereby declare the following to be a full, clear, and exact description thereof, which will enable those skilled in the art to make and use the same, reference being had to the accompanying drawing forming part of this specification, in which drawing—

Figure 1:
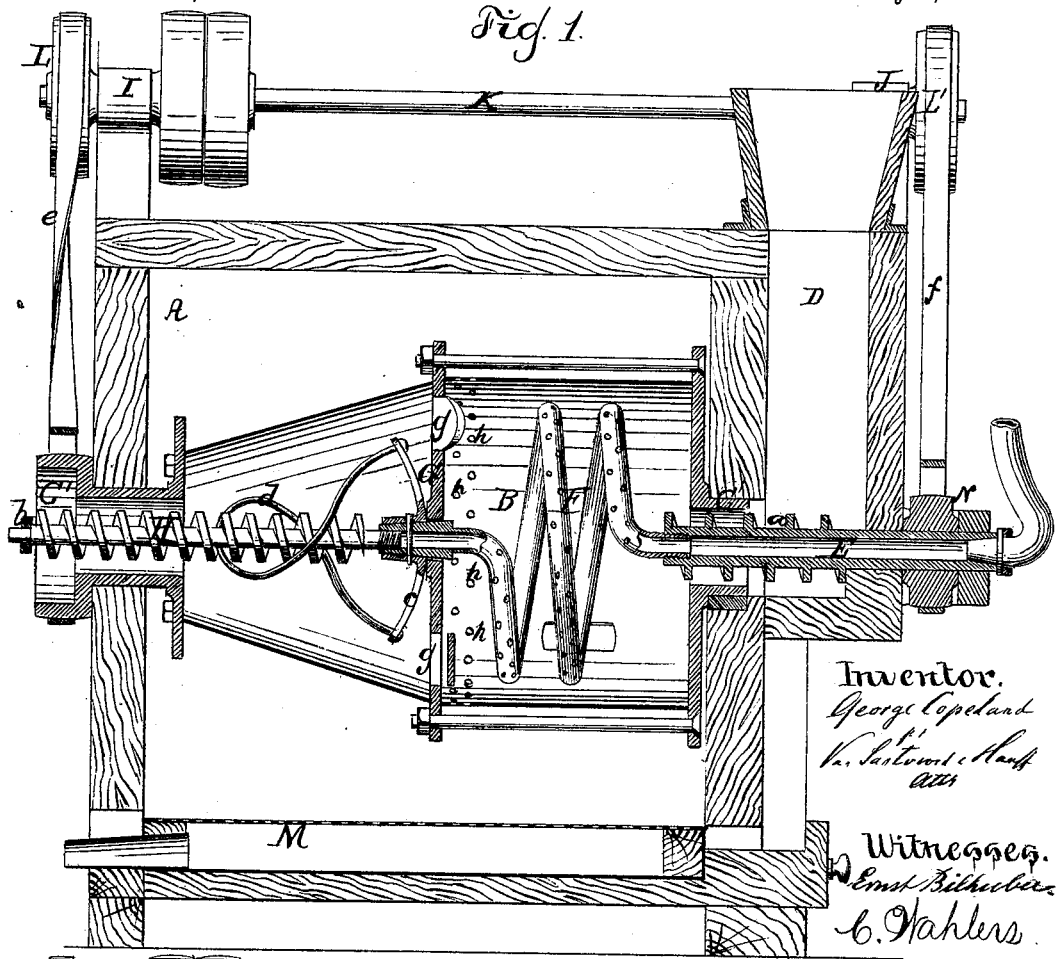
Figure 2:
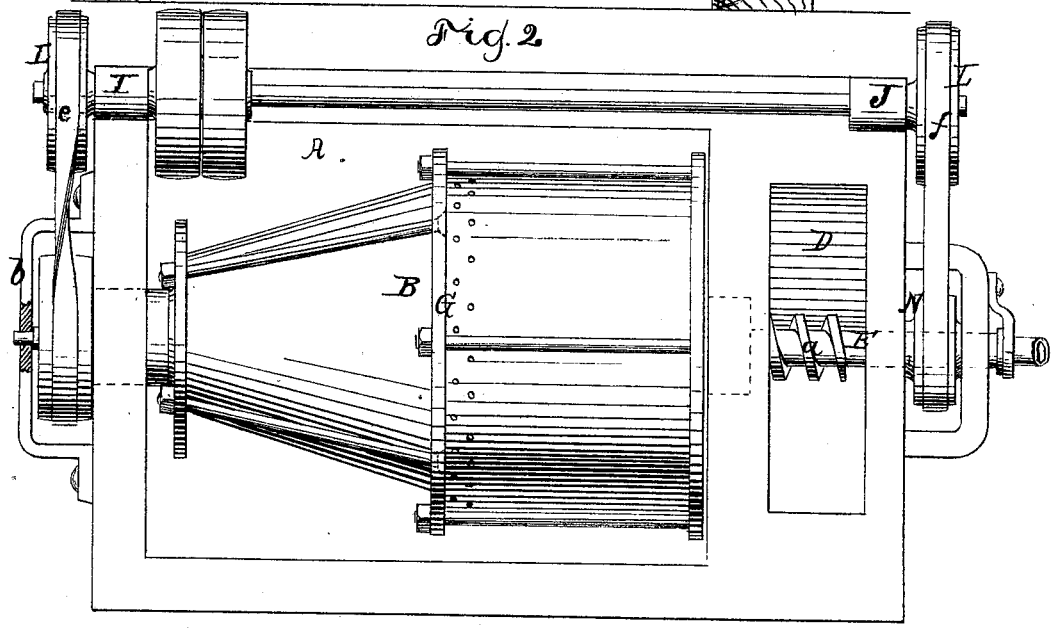

Figure 1 is a vertical central section of my machine. Fig. 2 is a plan or top view thereof.

Similar letters indicate corresponding parts.

This invention relates to an apparatus for thoroughly cleaning grain, and especially wheat, just before grinding, so as to free it from all impurities, and to produce a good quality of flour from an inferior wheat. My invention consists in a cylinder, revolving in a box or frame on hollow gudgeons or journals, through which the grain is forced into the cylinder by means of a spirally-wound blade or flange arranged on a hollow shaft within said gudgeon, and directly beneath the hopper or supply-opening of the machine. From said hollow shaft, and within the cylinder, extends a perforated coiled pipe, into which water is passed through said shaft, and which is caused to revolve in an opposite direction to that of the cylinder, so as to agitate and thoroughly scour the wheat by means of the water issuing from the perforations in the same, the water being permitted to pass off through perforations in the cylinder. The cylinder has a partition or diaphragm through the center, with two or more openings, through which the grain passes after having been thoroughly washed, said openings being provided with gates to open and close them for the purpose of controlling the flow of its contents, as some grain needs more washing than others. The partition forms a bearing for the coiled pipe, which extends through the same and connects with a discharge-screw which serves to force the grain through the hollow gudgeon on the delivery end of the cylinder, which tapers down toward its delivery end in the form of a truncated cone. The water issuing from the coiled perforated pipe within the cylinder is thrown in among the grain by centrifugal force, the pipe revolving in an opposite direction to that of the cylinder, and receiving its motion from a belt connected with a pulley on one end of the driving-shaft of the machine, on the opposite end of which is mounted a similar pulley, from which extends a belt which passes over a pulley formed on the outer end of the hollow gudgeon of the cylinder on the discharge end of the machine, so as to impart to said cylinder the required motion. The cylinder is mounted in a box or frame, in the lower part of which is arranged a trough to receive the dirty water flowing from the perforations of said cylinder.

In the drawing, the letter A designates a box or frame, in which is mounted horizontally a cylinder or drum, B, by means of hollow gudgeons or journals C C' arranged on the ends of the same. Through the hollow gudgeon C, and beneath the hopper D, passes a pipe, E, to which is connected a hose, from which it receives water. On the pipe E I have wound spirally a blade or flange, *a*, which serves to carry the grain entering through the hopper D into the cylinder B. To the inner end of pipe E is secured a perforated spiral pipe, F, which coils around within the cylinder B, and thence passes through a partition or diaphragm, G, arranged within the same, and it connects with a discharge-screw, H, which extends through the hollow gudgeon C', and has its bearing in a bridge, *b*, secured to the end of the frame A. From that portion of the pipe F which passes through the partition G extends a curved blade, *c*, to which is attached a curved or twisted wire, *d*, which aids in discharging the grain. On the top end of the frame A are mounted the journals I J, which form the bearings for the driving-shaft K, on one end of which is mounted the pulley L, which imparts motion to the cylinder by means of a belt, *e*, and on the opposite end a similar pulley, L', which connects with a pulley, N, on the pipe F by means of a belt, *f*.

The grain entering the hopper D is taken up by the screw *a* and carried into the cylinder D, where it is subjected to the action of the water issuing from the perforations in the coiled pipe F, which revolves in an opposite direction to that of the cylinder B, and thereby throws the water in among the grain with great force. Having been thoroughly washed, the grain passes through openings *g* in the diaphragm G (which are formed by punching up the metal, and provided with gates so that they can be opened or closed as desired,) into the delivery end of the cylinder, where it is thrown forward by the curved wire *d*, and taken up by the discharge-screw H, and thence passes out of the machine.

The dirty water discharges from the cylinder B through perforations *h h*, or by any other desirable means, such as, for instance, a wire-gauze or a continuous wire round the cylinder. In the lower part of the box or frame A I have provided a trough, M, which receives the dirty water issuing from the cylinder.

It is obvious that the cylinder may be placed either in a vertical or horizontal position, as desired.

What I claim as new, and desire to secure by Letters Patent, is—

1. The cylinder B, mounted on the hollow gudgeons C C' within the box or frame A, and provided with perforations *h* for discharging the water, in combination with the spiral water-pipe F, substantially as described.

2. The partition or diaphragm G, arranged within the cylinder B, and provided with gates *g* which can be opened or closed, as described.

3. The spiral blade *a* on the water-pipe E for carrying the grain into the cylinder B, in combination with the discharge-screw H for discharging the grain, substantially as set forth.

4. The combination of the driving-shaft K with the hollow gudgeon C', pulley N, cylinder B, coiled pipe F, and discharge-screw H, substantially as described.

5. The combination of the box A, cylinder B, hopper D, and trough M with the feed-screw *a*, coiled pipe F, and discharge-screw H, as set forth.

GEORGE COPELAND.

Witnesses:
PERCY B. SMITH,
GILBERT STANLEY.